United States Patent [19]

Seehawer

[11] 3,767,209

[45] Oct. 23, 1973

[54] ARRANGEMENT FOR THE PRECISE POSITIONING OF MAGNETIC HEADS

[75] Inventor: Eberhard Seehawer, Berlin, Germany

[73] Assignee: Firma Wolfgang Bogen GmbH, Berlin, Germany

[22] Filed: Feb. 10, 1971

[21] Appl. No.: 114,170

[30] Foreign Application Priority Data

Feb. 17, 1970 Germany .................. P 20 07 198.1

[52] U.S. Cl. .................................................. 274/4 R

[51] Int. Cl. .......................................... G11b 21/26

[58] Field of Search ............................ 340/174.1 F; 179/100.2 C; 274/4 R

[56] References Cited

UNITED STATES PATENTS

| | | | |
|---|---|---|---|
| 2,721,905 | 10/1955 | Munroe | 179/100.2 C |
| 3,495,049 | 2/1970 | Humphreys et al. | 274/4 R |
| 3,334,192 | 8/1967 | Camras | 179/100.2 C |

FOREIGN PATENTS OR APPLICATIONS

| | | | |
|---|---|---|---|
| 1,119,423 | 7/1968 | Great Britain | 179/100.2 C |
| 244,400 | 9/1967 | U.S.S.R. | 179/100.2 C |

*Primary Examiner*—Harry N. Haroian
*Attorney*—Cushman, Darby & Cushman

[57] ABSTRACT

An apparatus for properly positioning a magnetic head in a screening housing so that the head maintains a relatively constant angular relation to a magnetic tape or the like which passes the head in engagement for reading, reproducing or erasing whereby a plurality of fitting markers are provided on the floor of the housing with which the head cooperates. In the embodiment below, the markers are tongues bent up from the screening housing floor and a spring in the housing exerts a force on the head urging it against the tongues. The base plate upon which the housing is mounted is also preferably provided with similar tongues, serving as fitting markers, so that each tongue of the base plate engages one of the tongues of the housing floor to further properly position the housing.

5 Claims, 2 Drawing Figures

INVENTOR
EBERHARD SEEHAWER
BY
By Cushman, Darby & Cushman
ATTORNEYS

ARRANGEMENT FOR THE PRECISE POSITIONING OF MAGNETIC HEADS

The invention relates to an apparatus for positioning a magnetic head.

Magnetic heads for recording, reproducing and erasing information on magnetic tapes and the like are usually mounted in static and/or magnetic screening housing as a protection against stray electrical and magnetic interference fields. This measure particularly is useful for recording and reproducing magnetic heads because these magnetic heads are particularly sensitive to interference fields which result, in the case of recording heads, in a faulty recording and, in the case of reproducing heads, in interference voltages in the output signal.

Furthermore, in the case of devices which serve for recording and reproducing magnetic tapes and the like it is necessary that the information carrier wind around the magnetic head at a favorable angle and thus assures a definite contact surface between the carrier and the head. A constant specific pressure between the carrier and head increases useful life of tape and head. Further, for reproducing magnetic heads, the angle of wrap and thus the contact pressure must be maintained very precisely for still another reason and must also be reproducible. The reason for this requirement is the dependence of the frequency response in the case of low frequencies on the contact length between the carrier and the reproducing magnetic head. When contact varies, the frequency response of the head produces amplitude distortions which appear as maximum and minimum voltages, the intensity of which increases in the direction of the low frequencies. Especially in the case of devices for the recording and reproducing of language (speech), and music, these distortions, which are also called "surface resonances," bass bumps or ripple in the case of low frequencies, are preferably avoided since they do not occur in the original sound phenomenon.

The attaching or positioning devices for magnetic heads known heretofore do not ahcieve the required precision of the angle of wrap.

The invention relates to an arrangement for precisely positioning magnetic heads in order to maintain a constant and reproducible angle of grip of the carrier on the magnetic head. According to this invention markings for fitting the magnetic head are provided on the screening housing floor against which the magnetic head is placed and attached. A spring is preferably provided in the housing to exert a force on the magnetic head to press it against the markings and this spring is positioned so that the magnetic head is fixed by it both perpendicularly and horizontally.

These markers can effectively cooperate with the step-like sections of the surface of the magnetic head. Preferably, the base plate too, on which the screening housing with the magnetic head has been attached, is also provided with similar markings for positioning the housing as well. Preferably, the markings consist of tongues that have been bent up from their plane and have been stamped in on three sides, whereby the tongues of the base plate engage with the pressed out parts formed by the tongues of the housing.

Many other objects and purposes of the invention will be clear from the following detailed description of the invention in which.

Figure 1:
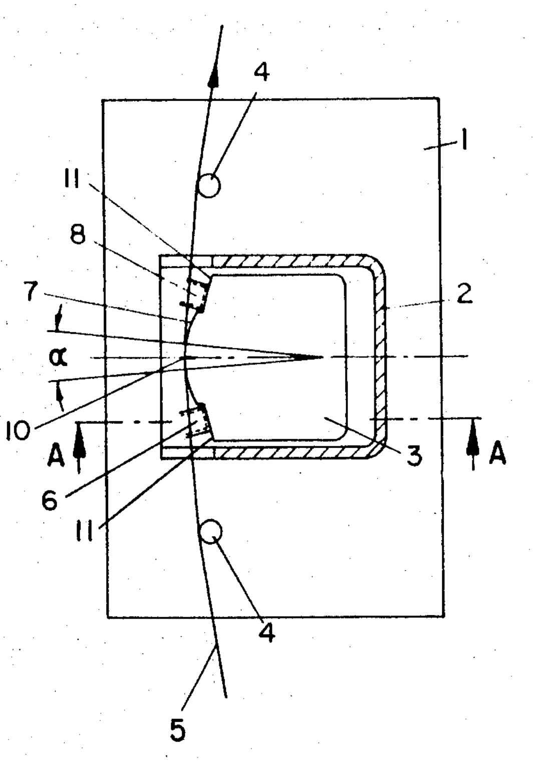
FIG. 1 shows a plan view of the apparatus in a section through the housing.
Figure 2:
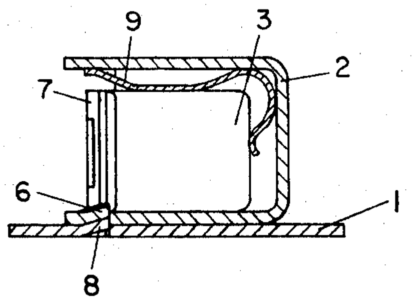
FIG. 2 shows a section on the line A—A of FIG. 1.

As shown in FIGS. 1 and 2, screening box 2 is mounted by any suitable means on base plate 1 of a conventional receiving or reproducing device, which housing is intended for holding magnetic head 3 and which screens that head against stray electrical or magnetic interference fields. Lateral to screening box 2, guide pegs 4 for a magnetic tape 5 are also attached to plate 1 to ensure the optimum angle of wrap *d* of magnetic tape 5 around magnetic head 3.

Screening box 2 which has three sides, a floor and a top is provided on its floor with two fitting markings 6. Any desired number of such markings can of course be provided, but two have been found to be quite satisfactory. These markings can be formed by stamping on three sides and bending up the stamped portions of the housing floor to produce tongues with, for practical purposes, perpendicular front surfaces. The front or running surface 7 of the magnetic head 3 fits securely against fitting markers 6. A spring 9 is provided inside housing 2 as shown and this spring 9 is effectively bent in such a way that magnetic head 3 is forced down toward the floor of the screening box 2 as well as forward against fitting markers 6. The insertion and the precise fixing of the position of the magnetic head 3 in the housing 2 is accomplished in a simple manner by pushing the magnetic head with spring 9 placed on it into screening housing 2. Thus, spring 9 precisely and automatically positions magnetic head 3.

The described installation will be of advantage particularly in that case where the surface of the magnetic head 3 has been provided with step-like sections 11, since in this case the fitting markers 6 can be located so as to fit against these steps 11. It is also desirable to provide similar tongues or fitting markers 8 on base plate 1, which markers each cooperate with one of the tongues or fitting markers 6 of screening box 2, so that in this manner a screening box 2 is also precisely aligned with magnetic head 3 on base plate 1.

Many changes and modifications in the above embodiment of the invention can of course be made without departing from the scope of the invention and accordingly that scope is intended to be limited only by the scope of the appended claims.

What is claimed is:

1. In combination:

a stray field screening housing for holding a matnetic head said housing having a top, a plurality of sides, a bottom and a plurality of separated fitting markers formed on said bottom and raised above it for properly locating a head, a magnetic head mounted in said housing so as to abut in cooperation with said fitting markers so that said head is properly located, and a base plate fastened to the bottom of said housing, said base plate having a plurality of further fitting markers each cooperating with one of said fitting markers of said housing for properly locating said housing.

2. In combination:

a stray field screening housing for holding a magnetic head, said housing having a top, a plurality of sides, a bottom and a plurality of separated fitting markers formed on said bottom and raised above it for properly locating a head,

- a magnetic head mounted in said housing so as to abut in cooperation with said fitting markers so that said head is properly located, and
- a spring located in said housing for exerting a force on said head to urge said head into its proper location in contact with said fitting markers.

3. In a combination as in claim 2 wherein said spring exerts a force in both a horizontal direction toward said markers and in a vertical direction toward said bottom.

4. In a combination as in claim 2 wherein each of said markers is a tongue which has been stamped in on three sides and which has been bent up from said bottom or base plate.

5. In a combination as in claim 1 wherein each of said markers is a tongue which has been stamped in on three sides and which has been bent up from said base.

* * * * *